United States Patent [19]

Noethe

[11]  4,348,307
[45]  Sep. 7, 1982

[54] SEALING MATERIALS FOR ELECTRICAL AND OPTICAL COMMUNICATION CABLES AND CABLE CONNECTORS

[75] Inventor: Bjoern Noethe, Ebersberg, Fed. Rep. of Germany

[73] Assignee: Siemens Aktiengesellschaft, Berlin and Munich, Fed. Rep. of Germany

[21] Appl. No.: 212,321

[22] Filed: Dec. 2, 1980

Related U.S. Application Data

[63] Continuation-in-part of Ser. No. 65,961, Aug. 13, 1979, abandoned.

[30] Foreign Application Priority Data

Oct. 30, 1978 [DE] Fed. Rep. of Germany ....... 2847387

[51] Int. Cl.$^3$ ................................................ C08K 5/05
[52] U.S. Cl. ...................................... 528/49; 528/74.5
[58] Field of Search ................... 260/33.4 UR, 18 TN

[56] References Cited

U.S. PATENT DOCUMENTS 4,206,109  6/1980  Reischl ........................ 260/33.4 UR

FOREIGN PATENT DOCUMENTS 2324888  1/1975  Fed. Rep. of Germany .

*Primary Examiner*—Joseph L. Schofer
*Assistant Examiner*—N. Sarofim
*Attorney, Agent, or Firm*—Hill, Van Santen, Steadman, Chiara & Simpson

[57] ABSTRACT

Sealing materials for longitudinal sealing of electrical and optical communication cables and cable connectors are comprised of a mixture of a polyol, a diisocyanate, a polymerization catalyst and a plasticizing component, such as a monofunctional aliphatic alcohol. Exemplary polyols are selected from the group consisting of a polyester-polyether-polyol or a polyester-polyol. An exemplary diisocyanate are selected from the group of hexamethylene-1, 6-diisocyanate and trimethyl hexamethylene diisocyanate and an exemplary plasticizing component is 2-octyldodecanol. Such sealing material can be provided within the interior of communication cables about the various elements thereof and/or within cable connectors or sleeves wherein individual elements of two or more communication cables are joined.

1 Claim, No Drawings

SEALING MATERIALS FOR ELECTRICAL AND OPTICAL COMMUNICATION CABLES AND CABLE CONNECTORS

CROSS-REFERENCE TO RELATED APPLICATION

This is a continuation-in-part application of application Ser. No. 065,961, filed Aug. 13, 1979 now abandoned.

BACKGROUND OF THE INVENTION

1. Field of the Invention

The invention relates to communication cables, such as electrical and optical communication calbes and cable connectors and somewhat more particularly to a sealing material for longitudinal sealing of electrical and optical communication cables and cable connectors.

2. Prior Art

In order to prevent longitudinal spreading of water or dampness in communication cables, such as electrical or optical communication cables, which have leads insulated with a synthetic material, the cable core is filled with a water-repelling or water-absorbing, expanding material. For example, cellulose-like materials which increase in volume by a multiple upon contact with water, as well as expandable polyurethanes are known (for example see German OS No. 2,361,207). Likewise, petrolatum-like materials are also useful for such functions. Further, in optical communication cables, having transmission elements composed of glass fibers, petrolatum-like materials also function to assure the mobility of the transmission elements within the cable core (for example see German OS No. 2,302,662, which approximately corresponds to U.S. Pat. No. 4,072,398; or German OS No. 2,429,670 which approximately corresponds to British Patent Specification No. 1,445,732).

In order to expel water from a cable core of a communication cable and to prevent any further penetration of water therein, a sealing compound comprised of a polyol, an isocyanate-prepolymer, a gelling material and a catalyst are known. Over a relatively long period of time, such originally liquid material is converted into a soft, sticky compound which moistens the insulation layers about cable leads. Such sealing material essentially comprises a solution of a liquid urethane elastomer that reacts at room temperature in a relatively low viscosity oil. In this manner, a urethane elastomer is formed from a polyol and an isocyanate-prepolymer. Such polyol generally comprises a polyester, a polyether or caster oil. In formulating such sealing material, the polyol and isocyanate-prepolymer are dissolved in an aromatic solvent and a catalyst, such as dibutyl tin dilaurate is added whereby the urethane is formed (for example, see German OS No. 2,259,411, which approximately corresponds to U.S. Pat. No. 3,733,426).

In longitudinal sealing of communication cables, specific conditions must sometimes be taken into consideration for certain applications. For example, this is a case when a communication cable is utilized in a pressure environment wherein the cable core is subjected to an axial gas pressure during operation. In such an application, it is necessary to prevent the formation of uninterrupted gas channels in the longitudinal direction of the cable because such gas channels cause the migration of individual components with the cable core.

Similar conditions are required for cable connectors, such as, for example, cable sleeves. Thus, in connecting two communication cables, it is necessary to splice the lead bundles opened from each cable and to connect them with the leads of the other cable. The individual leads connected in such a manner must be insulated from the surrounding environment and from one another so that a structure forms which is significantly larger than the original cable, in terms of space. Further, since the insulation of the individual leads was opened during splicing, the connected structure must also be protected against moisture.

The art is aware that cable connectors and other cable devices can be filled with casting compounds, for example see British Patent Specification No. 1,157,435.

SUMMARY OF THE INVENTION

The invention provides a sealing material for communication cables, such as electrical and optical communication cables and cable connectors.

In accordance with the principles of the invention, a sealing material is formulated from a plurality of components so as to have numerous desirable characteristics, including a relatively good self-hardened capability after proper admixing of the components; a relatively low viscosity in a temperature range extending over about $-10°$ to $+50°$ C. during processing or application of the formulated sealing material; a relatively high elasticity; a relatively permanent adhesiveness; a relatively high imperviousness to moisture; a relatively high susceptibility to notching and a relatively high electrical resistance. The sealing material of the invention comprises a substantially uniform admixture of at least three components wherein the first component is based on a material selected from the group consisting of a polyester-polyether-polyol or a polyester-polyol admixed with a polymerization catalyst, for example comprised of dibutyl tin dilaurate; the second component is based on a material selected from the group consisting of hexamethylene-1, 6-diisocyanate and trimethyl hexamethylene diisocyanate and a third component is based on an internal plasticizing material for the sealing material, with the plasticizer material being a relatively low viscosity, branched, long-chained, aliphatic, monofunctional alcohol.

The invention also includes communication cable connectors for electrical and optical communication cables having a multiplicity of leads therein which are bundled, with a plurality of such bundles being present in each cable and being provided with an external protective covering and including connection means for associating respective ends of such cables with other like cables and a housing means surrounding the connection means and being comprised of a hardened, mechanically stable synthetic material filled with the sealing material described above.

The invention also includes a communication cable for transmission of information comprised of a plurality of leads therein with an external protective coating about such leads and the external protective covering being filled with the sealing material of the invention set forth earlier.

DESCRIPTION OF THE PREFERRED EMBODIMENTS

The invention provides a sealing material for longitudinal sealing of communication cables such as electrical and optical cables as well as cable connectors therefore filled with such sealing material. The sealing material of the invention provides a longitudinal moisture-impermeable seal over substantially longer time-spans than available with prior art sealing materials.

In accordance with the principles of the invention, a sealing material based on polyurethane is comprised of a substantially uniform admixture of a first component (A) based on the material selected from the group consisting of a polyester-polyether-polyol or a polyester-polyol admixed with a polymerization catalyst, such as dibutyl tin dilaurate, a second component (B) based on a diisocyanate, and a third component (C) based on an internal plasticizer component for the sealing materials. In accordance with the principles of the invention, the diisocyanate component is selected from the group consisting of a relatively low viscosity monomeric hexamethylene-1, 6-diisocyanate and trimethyl hexamethylene diisocyanate; and the plasticizer material is a relatively low viscosity, branched, long-chained, aliphatic, monofunctional alcohol, such as 2-octdodecanol.

In formulating sealing materials of the invention, the presence of the monofunctional alcohol provides chain termination during the polyurethane formation and to the formation of terminal aliphatic groups anchored in the resultant molecular network. Such molecular network thus has a high elasticity and a permanent adhesiveness between the cross-linked components thereof without a danger that a change in such sealing material might occur over relatively long time spans because of component migration effects.

Exemplary embodiments which will illustrate to those skilled in the art further details of the composition of the inventive sealing material are presented hereinafter, however, such embodiments are not to be construed as limiting the scope of the invention in any way.

EXAMPLE I

Component A: 460 g of a polyether-polyester-polyol with an equivalent weight of about 350, a viscosity of about 2500 mPa.sec at 25° C. and a density of about 0.95 g/ml at 20° C., and 0.2 g dibutyl tin dilaurate
Component B: 160 g hexamethylene-1, 6-diisocyanate
Component C: 177 g 2-octyldodecanol

EXAMPLE II

Component A: 460 g anhydrous castor oil and 0.2 g dibutyl tin dilaurate
Component B: 160 g hexamethylene-1, 6-diisocyanate
Component C: 177 g 2-octyldodecanol

EXAMPLE III

Component A: 414 g of Component A from Example I with 0.3 g dibutyl tin dilaurate
Component B: as in Example I
Component C: 217 g of Component C from Example I

EXAMPLE IV

Component A: 483 g of Component A from Example I and 0.2 g dibutyl tin dilaurate
Component B: 160 g hexamethylene-1, 6-diisocyanate
Component C: 177 g 2-octyldodecanol In the above exemplary embodiments, Component C may also comprise other fatty alcohols.

Further, in the above exemplary embodiments, Component B may, in addition to hexamethylene- 1, 6-diisocyanate also be trimethyl hexmethylene diisocyanate.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

I claim as my invention:

1. A sealing material based on polyurethane for longitudinal sealing of electrical and optical communication cables and cable connectors, comprised of a substantially uniform mixture consisting essentially of:
    a first component (A) formed of a material selected from the group consisting of polyester-polyether-polyol with an equivalent weight of about 350, a viscosity of about 2500 mPa.sec at 25° C. and a density of about 0.95 g/ml at 20° C. and anhydrous caster oil, said material being mixed with dibutyl tin dilaurate;
    a second component (b) consisting of hexamethylene-1, 6-diisocyanate; and
    a third component (C) consisting of 2-octyldodecanol.

* * * * *